United States Patent
Masi et al.

(10) Patent No.: US 9,534,105 B2
(45) Date of Patent: Jan. 3, 2017

(54) STABILIZED COMPOSITION COMPRISING HOMOPOLYMERS OR COPOLYMERS OF ETHYLENE AND NATURAL ANTIOXIDANTS

(71) Applicant: Versalis S.P.A., S. Donato Mil.se (IT)

(72) Inventors: Francesco Masi, Sant'Angelo Lodigiano (IT); Cosimo Carfagna, Capracotta (IT); Pierfrancesco Cerruti, Eboli (IT); Paola Persico, Naples (IT)

(73) Assignee: Versalis S.P.A. (IT)

( * ) Notice: Subject to any disclaimer, the term of this patent is extended or adjusted under 35 U.S.C. 154(b) by 7 days.

(21) Appl. No.: 14/401,643

(22) PCT Filed: Jul. 24, 2013

(86) PCT No.: PCT/EP2013/065614
§ 371 (c)(1),
(2) Date: Nov. 17, 2014

(87) PCT Pub. No.: WO2014/016336
PCT Pub. Date: Jan. 30, 2014

(65) Prior Publication Data
US 2015/0148462 A1 May 28, 2015

(30) Foreign Application Priority Data

Jul. 27, 2012 (IT) .............. MI2012A1315

(51) Int. Cl.
*C08L 23/00* (2006.01)
*C08L 23/04* (2006.01)
*C08K 5/1545* (2006.01)
*C08K 5/00* (2006.01)
*C08K 5/37* (2006.01)
*C08K 5/45* (2006.01)

(52) U.S. Cl.
CPC ............ *C08K 5/1545* (2013.01); *C08K 5/005* (2013.01); *C08K 5/37* (2013.01); *C08K 5/45* (2013.01)

(58) Field of Classification Search
None
See application file for complete search history.

(56) References Cited

U.S. PATENT DOCUMENTS

| 2009/0041870 A1 | 2/2009 | Tan et al. |
| 2012/0046380 A1* | 2/2012 | Morrison ............ A61F 2/30767 522/75 |

FOREIGN PATENT DOCUMENTS

| EP | 0524404 A1 | 1/1993 | |
| EP | 0682073 A2 | 11/1995 | |
| EP | 2395048 A2 | 12/2011 | |
| IT | WO 2012066126 A1 * | 5/2012 | ............ C08K 5/005 |
| JP | 2002240848 A * | 8/2002 | |
| WO | 2010057644 A1 | 5/2010 | |
| WO | 2010129514 A2 | 11/2010 | |
| WO | 2011150312 A1 | 12/2011 | |
| WO | 2012066126 A1 | 5/2012 | |

OTHER PUBLICATIONS

International Search Report and Written Opinion dated Aug. 26, 2013 for PCT/EP2013/065614.
Colombo M. L. "An Update on Vitamin E, Tocopherol and Tocotrienol-Perspectives," Molecules (2010), vol. 15, pp. 2103-2113.
Sen C. K. et al., "Palm oil-derived natural vitamin E alpha-tocotrienol in brain health and disease," Journal of the American College of Nutrition (2010), vol. 29, No. 3, Supplement 1, pp. 314S-323S.
Biewenga et al., "The pharmacology of the antioxidant lipoic acid," General Pharmacology (1997), vol. 29, pp. 315-331.
Aruoma et al., "The antioxidant action of N-acetyl cysteine: its reaction with hydrogen peroxide, hydroxyl radical, superoxide, and hypochlorus acid," Free Radical Biology & Medicine (1989), vol. 6, pp. 593-597.
Pastore et al., "Analysis of glutathione: implication in redox and detoxification," Clinica Chimica Acta (2003), vol. 333, pp. 19-39.
Arteel and Sies, "The biochemistry of selenium and the glutathione system," Environmental Toxicology and Pharmacology (2001), vol. 10, pp. 153-158.
Sionkowska, "The influence of glutathione on the photochemical stability of collagen," Polymer Degradation and Stability (2001), vol. 73, pp. 107-112.

* cited by examiner

*Primary Examiner* — Brieann R Fink
(74) *Attorney, Agent, or Firm* — Abel Law Group, LLP

(57) ABSTRACT

Stabilized composition comprising: —at least one homopolymer or copolymer of ethylene; —at least one tocotrienol or at least a mixture of tocotrienol isomers.

13 Claims, No Drawings

STABILIZED COMPOSITION COMPRISING HOMOPOLYMERS OR COPOLYMERS OF ETHYLENE AND NATURAL ANTIOXIDANTS

The present invention relates to a stabilized composition comprising homopolymers or copolymers of ethylene and natural antioxidants.

More specifically, the present invention relates to a stabilized composition comprising at least one homopolymer or copolymer of ethylene, at least one tocotrienol or at least a mixture of tocotrienol isomers.

The present invention also relates to end-products obtained from said stabilized composition.

Furthermore, the present invention relates to a stabilizing composition comprising at least one tocotrienol or at least a mixture of tocotrienol isomers, and also to its use in the stabilization of homopolymers or copolymers of ethylene.

It is known that exposure to atmospheric oxygen which causes oxidation processes, combined with the action of temperature and of solar light, creates a series of structural changes in the main chain and/or in the side chains of organic polymers causing their degradation. Said degradation leads to a deterioration in the physico-chemical properties of the organic polymers such as, for example, a decrease in the impact strength or flexural strength, which negatively affects the macroscopic properties of the end-products.

It is also known that the above oxidation processes generally take place by means of a radical-type mechanism according to the following scheme:
- beginning of the process with the formation of reactive radical species;
- propagation of the process through a series of chain reactions between radicals and oxygen dissolved in the organic polymer, with the further formation of peroxy radicals on the main chain and/or on the side chains of said organic polymer;
- termination of the process through the deactivation of the above peroxy radicals by interaction between the peroxy radicals and the formation of stable covalent bonds.

Consequently, for any type of application, in particular for long-term applications or which envisage exposure to high temperatures or atmospheric agents, the organic polymers are stabilized by the addition of primary and secondary antioxidants.

Primary antioxidants, also known as "radical scavengers", are compounds capable of intercepting free radicals, giving them an active hydrogen atom or electrons, converting them into more stable compounds. The most widely-used primary antioxidants are sterically-hindered phenols, aromatic amines, sterically-hindered amines.

Secondary antioxidants, also known as "peroxide decomposers", are compounds capable of preventing the formation of free radicals by reaction with the peroxide radicals formed, converting them into non-radical species and, therefore, non reactive, and preventing branching of the polymeric chains. The most widely-used secondary antioxidants are phosphites, phosphonites, thioesters, metal thiocarbamates.

A further function of secondary antioxidants is to regenerate primary antioxidants. Secondary antioxidants generally function better in the presence of primary antioxidants.

It is known in the art, in fact, that the addition of a primary antioxidant (e.g., a sterically-hindered phenol) combined with a secondary antioxidant (e.g., a phosphite or a phosphonite) to an organic polymer, allows a synergic effect to be obtained, capable of significantly increasing the starting time of the degradation of said organic polymer.

The stabilization of organic polymers is one of the most important fields of research and of great interest for both scientific and industrial word. Future developments in this field are become increasingly influenced by requirements of an environmental type that stabilizers must satisfy.

In particular, ecological restrictions play a major role in the development of new stabilizers for organic polymers, more specifically with respect to stabilizers for organic polymers destined for food "packaging".

The stabilizers commonly used are generally synthetic compounds having relatively complex structures (e.g., sterically-hindered phenols, aromatic amines, sterically-hindered amines, phosphites, phosphonites). There is therefore the problem of their potential harmful effects when released into the environment and, in particular, when used in organic polymers destined for food packaging. These stabilizers can in fact migrate directly, or release by-products in foods, thus altering the organoleptic qualities of the same or even creating toxic effects in their subsequent use.

Even if the risk of said potential harmful effects has been reduced to the minimum, a research branch has been developed aimed at finding compounds of a natural origin as possible substitutes of the synthetic antioxidants indicated above, in order to reduce the risks linked with their use, to the minimum.

The limiting factor in the use of natural antioxidants, however, is often their limited thermal stability. Said natural antioxidants, in fact, often decompose at the temperatures used in the processing of organic polymers.

Among natural antioxidants, tocopherols have been widely studied, in particular α-tocopherol, i.e. the main component of Vitamin E, which is a vitaminic nutrient essential and vital for human beings, and a powerful liposoluble antioxidant present in many vegetables.

It is known that natural Vitamin E comprises various components, i.e. four tocopherols (α-, β-, γ and δ-tocopherol), four tocotrienols (α-, β-, γ and δ-tocotrienol), four tocodienols (α-, β-, γ and δ-tocodienol), four tocomonoenols (α-, β-, γ and δ-tocomonoenol). All said components have a structure which comprises a chromanol ring and a side chain. In particular, the four tocopherols have a completely saturated side chain; the four tocotrienols have an unsaturated side chain containing double bonds in position 3', 7' and 11' (as represented in the general formula (I) indicated below); the four tocodienols have a side chain with two double bonds; and the four tocomonoenols have a single double bond in the side chain. Said four tocopherols, four tocotrienols, four tocodienols, and four tocomonoenols differ from each other in the number and position of methyl groups on the chromanol ring.

The structure of tocotrienols is represented by the following general formula (I):

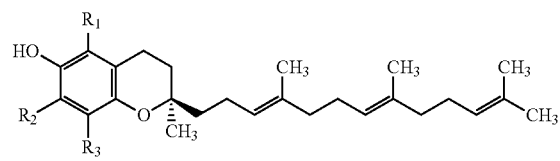

wherein:
R$_1$, R$_2$ and R$_3$, equal to or different from each other, represent a hydrogen atom, or a methyl group.
In particular, in the above general formula (I):
R$_1$, R$_2$ and R$_3$, are methyl, in the case of α-tocotrienol;
R$_1$ and R$_3$ are methyl and R$_2$ is a hydrogen atom, in the case of β-tocotrienol;
R$_2$ and R$_3$ are methyl and R$_1$ is a hydrogen atom, in the case of γ-tocotrienol;
R$_1$, R$_2$ and R$_3$ are a hydrogen atom, in the case of δ-tocotrienol.

It is known that tocotrienols have many therapeutic and preventive properties in numerous pathologies. Said tocotrienols can be used, for example, as antioxidants, anti-atherosclerotic agents, neuroprotectors, anti-tumoral agents, anti-thrombolytic agents, cholesterol-reducers, agents with a hypotensive activity, as described, for example, in american patent application US 2009/0041870, or in international patent application WO 2011/150312.

Recent studies on Vitamin E have clearly indicated that the various components of Vitamin E mentioned above are not redundant with respect to their therapeutic properties. Tocotrienols, in fact, have proved to have different therapeutic properties with respect to those of tocopherols, as described, for example, by Colombo M. L. "*An Update on Vitamin E, Tocopherol and Tocotrienol-Perspectives*", in "*Molecules*" (2010), Vol. 15, pages 2103-2113; Sen C. K. et al., "*Palm oil-derived natural vitamin E alpha-tocotrienol in brain health and disease*", in "*Journal of the American College of Nutrition*" (2010), Vol. 29, No. 3, Supplement 1, pages 314S-323S.

International patent application WO 2012/066126 describes a stabilized composition comprising:
at least one homopolymer or copolymer of ethylene;
at least one tocopherol;
at least one compound containing sulfur, selected from glutathione, α-lipoic acid, acetyl-cysteine.
Said tocopherol can be selected from:
D,L-α-tocopherol (synthetic vitamin E);
methyl derivatives of [2-methyl-2-(4',8'12'-trimethyltridecyl)-6-chromanol]tocol comprising D-α-tocopherol (5,7,8-trimethyltocol), D-β-tocopherol (5,8-dimethyltocol), D-γ-tocopherol (7,8-dimethyltocol), D-δ-tocopherol (8-methyltocol), or mixtures thereof (compounds present in natural Vitamin E);
D-α-tocopherol acetate, D,L-α-tocopherol acetate, D-α-tocopherol succinate, acid polyethyleneglycol 1000 succinate of D-α-tocopherol, D,L-α-tocopherol quinone, or mixtures thereof;
methyl derivatives of [2-methyl-2-(4',8'12'-trimethyltrideca-3',7',11'-trienyl)-6-chromanol]tocotrienol;
or mixtures thereof.

The use of at least one tocopherol and of at least one compound containing sulfur among those indicated above, is said to be capable of stabilizing homopolymers and copolymers of ethylene. In particular, the above stabilized composition is said to have a good resistance to oxidative degradation.

In spite of the numerous efforts made in the art, the study of the use of antioxidants of a natural origin is still of great interest.

The Applicant has therefore considered the problem of finding antioxidants of a natural origin having improved capacities for stabilizing homopolymers or copolymers of ethylene.

The Applicant has now found that the use of a tocotrienol or of at least a mixture of tocotrienol isomers is capable of stabilizing homopolymers or copolymers of ethylene. In particular, said use allows stabilized compositions to be obtained, having a higher resistance to oxidative degradation with respect to the stabilized composition described in the above patent application WO 2012/066126.

An object of the present invention therefore relates to a stabilized composition comprising:
at least one homopolymer or copolymer of ethylene;
at least one tocotrienol or at least a mixture of tocotrienol isomers.

For the purposes of the present description and of the following claims, the definitions of the numerical ranges always comprise the extremes, unless otherwise specified.

For the purposes of the present description and of the following claims, the term "comprising" also includes the terms "which essentially consists of" or "which consists of".

According to a preferred embodiment of the present invention, said homopolymer or copolymer of ethylene can be selected from:
high-density polyethylene (HDPE);
ultra-high-molecular-weight polyethylene (UHMWPE);
medium-density polyethylene (MDPE);
low-density polyethylene (LDPE);
linear-low-density polyethylene (LLDEP), very-low-density polyethylene (VLDPE), ultra-low-density polyethylene" (ULDPE), which are copolymers of ethylene with at least one aliphatic α-olefin having formula CH$_2$=CH—R wherein R represents a linear or branched alkyl group, preferably linear, containing from 1 to 12 carbon atoms, selected, for example, from: propylene, 1-butene, 1-pentene, 1-hexene, 1-octene, 1-decene;
ethylene-vinyl acetate copolymers (EVA);
elastomeric ethylene-propylene copolymers (EPR);
elastomeric ethylene-propylene-diene copolymers (EPDM) wherein the diene generally contains from 3 to 12 carbon atoms and can be selected from: 1,3-butadiene, isoprene, 1,4-hexadiene, 1,4-cyclohexadiene, 5-ethylidene-2-norbornene, 5-methylene-2-norbornene, or mixtures thereof;
or mixtures thereof.

Examples of homopolymers or copolymers of ethylene that can be used in the present invention and that are currently commercially available are the products Flexirene®, Eraclene®, Riblene®, Clearflex®, Greenflex®, Dutral®, of Polimeri Europa (now versalis spa); MDPE HT 514 of Total Petrochemical; Engage® of DuPont-Dow Elastomers; Exact® of Exxon Chemical.

The homopolymers and copolymers of ethylene indicated above can be obtained through polymerization techniques known in the art, in the presence of Ziegler-Natta catalysts, or in the presence of "single-site" catalysts such as, for example, metallocene or hemi-metallocene catalysts, or by means of radical processes.

According to a preferred embodiment of the present invention, said tocotrienol can be selected from tocotrienols having general formula (I):

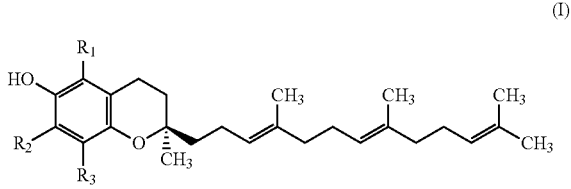

wherein:
R$_1$, R$_2$ and R$_3$, equal to or different from each other, represent a hydrogen atom, or a methyl group.

According to a further preferred embodiment of the present invention, said tocotrienol can be selected from the following tocotrienol isomers:

α-tocotrienol having formula (Ia):

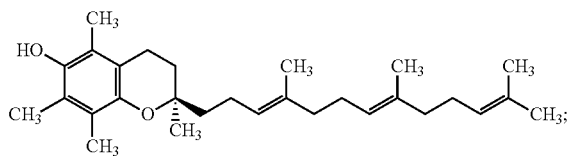

(Ia)

β-tocotrienol having formula (Ib):

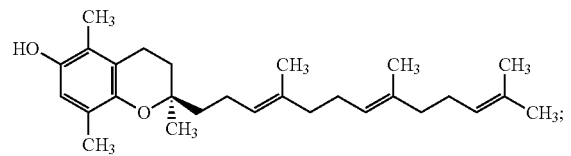

(Ib)

γ-tocotrienol having formula (Ic):

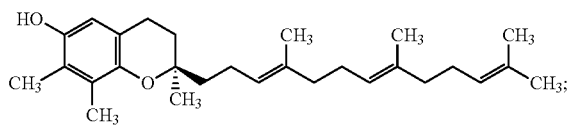

(Ic)

δ-tocotrienol having formula (Id):

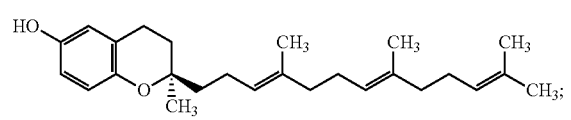

(Id)

or mixtures thereof.

According to a preferred embodiment of the present invention, said mixture of tocotrienol isomers can comprise at least two of the tocotrienol isomers having formulae (Ia)-(Id) indicated above.

According to a preferred embodiment of the present invention, said mixture of tocotrienol isomers can comprise:
(a) from 30% by weight to 60% by weight, preferably from 40% by weight to 55% by weight, of γ-tocotrienol having formula (Ic);
(b) from 20% by weight to 40% by weight, preferably from 25% by weight to 35% by weight, of α-tocotrienol having formula (Ia);
(c) from 10% by weight to 30% by weight, preferably from 15% by weight to 25% by weight, of δ-tocotrienol having formula (Id);
the total of (a)+(b)+(c) being 100.

According to a preferred embodiment of the present invention, said tocotrienol or said mixture of tocotrienol isomers can be present in the stabilized composition in a quantity ranging from 0.01% by weight to 3% by weight, preferably from 0.1% by weight to 2% by weight, with respect to the total weight of said stabilized composition.

In order to further improve the resistance to oxidative degradation of the stabilized composition object of the present invention, said stabilized composition can comprise at least one compound containing sulfur selected from α-lipoic acid, acetyl-cysteine, glutathione.

According to a preferred embodiment of the present invention, said stabilized composition can comprise at least one compound containing sulfur selected from α-lipoic acid, acetyl-cysteine, glutathione, preferably α-lipoic acid.

α-Lipoic acid, acetyl-cysteine and glutathione are compounds known as natural antioxidants used, in particular, for preventing damage caused by oxidation in the human body.

α-Lipoic acid having formula (II):

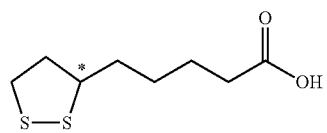

(II)

is a compound that plays a key role in the cell energy metabolism of most living beings. α-Lipoic acid, in fact, has various particular features which make it not only extraordinarily effective as antioxidant, but also absolutely indispensable for our organism for opposing damage associated with the formation of free radicals as described, for example, in the following article: Biewenga et al., "*The pharmacology of the antioxidant*", published in "*General Pharmacology*" (1997), Vol. 29, pages 315-331.

Acetyl-cysteine having formula (III):

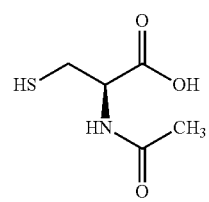

(III)

is the acetylated form, more effectively absorbed and metabolized, of the antioxidant sulfurated amino acid cysteine as described, for example, in the following article: Aruoma et al., "*The antioxidant action of N-acetyl cysteine: its reaction with hydrogen peroxide, hydroxyl radical, superoxide, and hypochlorus acid*", published in "*Free Radical Biology & Medicine*" (1989), Vol. 6, pages 593-597.

Glutathione having formula (IV):

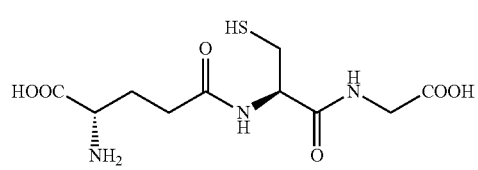

(IV)

is a known defender of the cell system against the effects of oxidation as described, for example, in the following articles:

Pastore et al., "*Analysis of glutathione: implication in redox and detoxification*", published in "*Clinica Chimica Acta*" (2003), Vol. 333, pages 19-39;

Arteel and Sies, "*The biochemistry of selenium and the glutathione system*", published in "*Environmental Toxicology and Pharmacology*" (2001), Vol. 10, pages 153-158;

Sionkowska, "*The influence of glutathione on the photochemical stability of collagen*", published in "*Polymer Degradation and Stability*" (2001), Vol. 73, pages 107-112.

According to a preferred embodiment of the present invention, said compound containing sulfur can be present in the stabilized composition in a quantity ranging from 0.05% by weight to 1.5% by weight, preferably ranging from 0.1% by weight to 1% by weight, with respect to the total weight of said stabilized composition.

The Applicant has also found that the use of a stabilizing composition comprising at least one tocotrienol or at least a mixture of tocotrienol isomers, and at least a mixture of tocopherol isomers, allows stabilized compositions to be obtained, having a higher resistance to oxidative degradation with respect to that of the stabilized composition described in the above international patent application WO 2012/066126.

A second object of the present invention therefore relates to a stabilized composition comprising:
- at least one homopolymer or copolymer of ethylene;
- at least one stabilizing composition comprising:
  - ($a_1$) from 50% by weight to 90% by weight, preferably from 60% by weight to 80% by weight, of at least one tocotrienol or of at least a mixture of tocotrienol isomers;
  - ($b_1$) from 10% by weight to 50% by weight, preferably from 20% by weight to 40% by weight, of tocopherol isomers;
  the total of ($a_1$)+($b_1$) being 100.

The Applicant has also found that the use of a stabilizing composition comprising at least one tocotrienol or at least a mixture of tocotrienol isomers, at least a mixture of tocopherol isomers, and at least one compound containing sulfur selected from α-lipoic acid, acetyl-cysteine, glutathione, allows stabilized compositions to be obtained, having a higher resistance to oxidative degradation with respect to that of the stabilized composition described in the above international patent application WO 2012/066126.

A third object of the present invention therefore relates to stabilized composition comprising:
- at least one homopolymer or copolymer of ethylene;
- at least one stabilizing composition comprising:
  - ($a_1$) from 50% by weight to 90% by weight, preferably from 60% by weight to 80% by weight, of at least one tocotrienol or of at least a mixture of tocotrienol isomers;
  - ($b_1$) from 10% by weight to 50% by weight, preferably from 20% by weight to 40% by weight, of tocopherol isomers;
    the total of ($a_1$)+($b_1$) being 100;
- at least one compound containing sulfur selected from α-lipoic acid, acetyl-cysteine, glutathione, preferably α-lipoic acid.

According to a preferred embodiment of the present invention, said homopolymers or copolymers of ethylene can be selected from those indicated above.

According to a preferred embodiment of the present invention, said tocotrienol or said mixture of tocotrienol isomers can be selected from those indicated above.

According to a preferred embodiment of the present invention, said tocopherol isomers can be selected from:

D,L-α-tocopherol (synthetic vitamin E);

methyl derivatives of [2-methyl-2-(4',8'12'-trimethyltridecyl)-6-chromanol]tocol comprising D-α-tocopherol (5,7,8-trimethyltocol), D-β-tocopherol (5,8-dimethyltocol), D-γ-tocopherol (7,8-dimethyltocol), D-δ-tocopherol (8-methyl-tocol), or mixtures thereof (compounds present in natural Vitamin E);

D-α-tocopherol acetate, D,L-α-tocopherol acetate, D-α-tocopherol succinate, acid polyethyleneglycol 1000 succinate of D-α-tocopherol, D,L-α-tocopherol quinone, or mixtures thereof;

or mixtures thereof.

According to a preferred embodiment of the present invention, said compound containing sulfur can be present in the stabilized composition in a quantity ranging from 0.05% by weight to 1.5% by weight, preferably ranging from 0.1% by weight to 1% by weight, with respect to the total weight of the stabilized composition.

According to a preferred embodiment of the present invention, said stabilizing composition can be present in the stabilized composition in a quantity ranging from 0.1% by weight to 3% by weight, preferably ranging from 0.2% by weight to 2% by weight, with respect to the total weight of the stabilized composition.

A further object of the present invention relates to end-products obtained from the above stabilized composition.

An additional object of the present invention also relates to a stabilizing composition comprising at least one tocotrienol or at least a mixture of tocotrienol isomers.

A further object of the present invention also relates to a stabilizing composition comprising:
- at least one tocotrienol or at least a mixture of tocotrienol isomers;
- at least one compound containing sulfur selected from α-lipoic acid, acetyl-cysteine, glutathione, preferably α-lipoic acid.

A further object of the present invention relates to the use of said stabilizing composition in the stabilization of homopolymers or copolymers of ethylene.

Another object of the present invention relates to a stabilizing composition comprising:
- ($a_1$) from 50% by weight to 90% by weight, preferably from 60% by weight to 80% by weight, of at least one tocotrienol or of at least a mixture of tocotrienol isomers;
- ($b_1$) from 10% by weight to 50% by weight, preferably from 20% by weight to 40% by weight, of tocopherol isomers;
  the total of ($a_1$)+($b_1$) being 100;
- at least one compound containing sulfur selected from α-lipoic acid, acetyl-cysteine, glutathione, preferably α-lipoic acid.

A further object of the present invention relates to the use of said stabilizing composition in the stabilization of homopolymers or copolymers of ethylene.

Some illustrative and non-limiting examples are provided hereunder for a better understanding of the present invention and for its embodiment.

EXAMPLE 1

The following compounds were used:
linear-low-density polyethylene (LLDPE): Flexirene® CL 10 U (non-stabilized) of Polimeri Europa (now versalis SpA);
D-α-tocopherol: Sigma Aldrich;
mixture of tocotrienol isomers: 50% by weight of γ-tocotrienol (Sigma Aldrich), 30% by weight of α-tocotrienol (Sigma Aldrich), 20% by weight of δ-tocotrienol (Sigma Aldrich);
stabilizing composition including 70% by weight of tocotrienol isomers and 30% by weight of tocopherol isomers (Tocomin® 50% C): Catotech;
α-lipoic acid: Sigma Aldrich.

The compositions comprising linear-low-density polyethylene (LLDPE) and the various antioxidants indicated above, were prepared operating in a mixer, as described hereunder.

The linear-low-density polyethylene (LLDPE) and the various antioxidants (the quantities of polyethylene and of the various antioxidants are indicated in Table 1) were fed to a Brabender Plastograph Ec mixer.

The mixer was heated to 190° C. and kept at this temperature for 6 minutes, under stirring, at a rotation rate of the screws equal to 16 revs per minute.

At the end, the mixtures (M0-M12) obtained were discharged from the mixer, cooled to room temperature (25° C.) and manually pelletized with nippers. The pellets obtained were transformed into thin films (100 μm in thickness) by means of hot moulding using a Collin P 200 E bench press, operating under the following conditions:
temperature: 190° C.;
pressure: 100 atmospheres;
time: 2 minutes.

Circular samples were collected from the films obtained and subsequently subjected to thermal analysis by means of a Differential Scanning calorimetry (DSC) and to chemiluminescence analysis in order to determine the resistance to oxidation: more details relating to these analyses are provided hereunder.

TABLE 1

| Mixture | LLDPE (%) | D-α-tocopherol (%) | Mixture of tocotrienol isomers (%) | Tocomin® 50%C (%) | α-lipoic acid (%) |
|---|---|---|---|---|---|
| M0 | 100 | — | — | — | — |
| M1 | 98.5 | 1.5 | — | — | — |
| M2 | 99.0 | 0.5 | — | — | 0.5 |
| M3 | 98.0 | 1.5 | — | — | 0.5 |
| M4 | 99.9 | — | 0.1 | — | — |
| M5 | 98.5 | — | 1.5 | — | — |
| M6 | 99.8 | — | 0.1 | — | 0.1 |
| M7 | 99.9 | — | — | 0.1 | — |
| M8 | 99.5 | — | — | 0.5 | — |
| M9 | 98.5 | — | — | 1.5 | — |
| M10 | 99.8 | — | — | 0.1 | 0.1 |
| M11 | 99.0 | — | — | 0.5 | 0.5 |
| M12 | 98.0 | — | — | 1.5 | 0.5 |

EXAMPLE 2

The following compounds were used:
elastomeric ethylene-propylene (EPR) copolymer: Dutral® CO 034 (non-stabilized) of Polimeri Europa (now versalis SpA);
D-α-tocopherol: Sigma Aldrich;
stabilizing composition comprising 70% by weight of tocotrienol isomers and 30% by weight of tocopherol isomers (Tocomin® 50% C): Carotech;
α-lipoic acid: Sigma Aldrich.

The compositions comprising the elastomeric ethylene-propylene (EPR) copolymer and the various antioxidants indicated above, were prepared operating in a mixer as described hereunder.

The elastomeric ethylene-propylene (EPR) copolymer and the various antioxidants (the quantities of EPR and of the various antioxidants are indicated in Table 2) were fed to a Brabender Plastograph Ec mixer.

The elastomeric ethylene-propylene (EPR) copolymer was introduced into the mixer which was heated to 200° C. and kept at this temperature for 2 minutes, under stirring, at a rotation rate of the screws equal to 16 revs per minute. The various antioxidants were subsequently introduced and the whole mixture was left under these operating conditions for 5 minutes.

The mixture M18, on the contrary, was obtained by operating at 150° C.: the remaining operating conditions remained unvaried.

At the end, the mixtures obtained (M13-M17) were discharged from the mixer, cooled to room temperature (25° C.) and manually pelletized with nippers. The pellets obtained were transformed into thin films (100 μm in thickness) by means of hot moulding using a Collin P 200 E bench press, operating under the following conditions:
temperature: 190° C.;
pressure: 100 atmospheres;
time: 2 minutes.

Circular samples were collected from the films obtained and subsequently subjected to thermal analysis by means of a Differential Scanning calorimetry (DSC) and to chemiluminescence analysis in order to determine the resistance to oxidation: more details relating to these analysis are indicated hereunder.

TABLE 2

| Mixtures | LLDPE (%) | D-α-tocopherol (%) | Tocomin® 50%C (%) | α-lipoic acid (%) |
|---|---|---|---|---|
| M13 | 100 | — | — | — |
| M14 | 98.5 | 1.5 | — | — |
| M15 | 98.0 | 1.5 | — | 0.5 |
| M16 | 98.5 | — | 1.5 | — |
| M17 | 98.0 | — | 1.5 | 0.5 |
| M18(*) | 98.0 | — | 1.5 | 0.5 |

(*)mixer temperature: 150° C.

EXAMPLE 3

As specified above, the circular samples obtained were subjected to thermal analysis by means of a Differential Scanning calorimetry (DSC) and to chemiluminescence analysis in order to determine the resistance to oxidation.

Thermal Analysis

The thermal analysis was carried out using a differential scanning calorimeter (DSC) Mettler Toledo DSC 30 operating in accordance with the standard ASTM D3895-1998: "Oxidative-Induction Time of Polyolefins by Differential Scanning calorimetry".

For this purpose, the circular samples were placed in open aluminium capsules, heated under a nitrogen flow, until the desired temperature was reached, and then kept at this temperature, under an atmosphere of oxygen, until the appearance of the exothermic peak.

Table 3 indicates the temperature values and the oxygen induction time (OIT) values, determined as described above at five different temperatures (i.e. 170° C., 180° C., 190° C., 200° C. and 220° C.), of the samples obtained as described in Example 1 (M0-M12).

Table 4 indicates the temperature values and the oxygen induction time (OIT) values, determined as described above at two different temperatures (i.e. 190° C. and 200° C.), of the samples obtained as described in Example 2 (M13-M18).

TABLE 3

| Samples | OIT (170° C.) (minutes) | OIT (180° C.) (minutes) | OIT (190° C.) (minutes) | OIT (200° C.) (minutes) | OIT (220° C.) (minutes) |
| --- | --- | --- | --- | --- | --- |
| M0  | 4   | 2   | (a) | (a) | (a) |
| M1  | 6   | 2   | 1   | (a) | (a) |
| M2  | 75  | 18  | 3   | (a) | (a) |
| M3  | 123 | 50  | 30  | 10  | 3   |
| M4  | 221 | 155 | 72  | 41  | 12  |
| M5  | 264 | 183 | 142 | 70  | 26  |
| M6  | 235 | 150 | 96  | 54  | 12  |
| M7  | 200 | 130 | 60  | 35  | 8   |
| M8  | 250 | 190 | 105 | 49  | 15  |
| M9  | 280 | 209 | 118 | 60  | 23  |
| M10 | 210 | 140 | 80  | 45  | 10  |
| M11 | 300 | 205 | 128 | 59  | 18  |
| M12 | 330 | 225 | 150 | 120 | 31  |

(a): immediate oxidation.

From the data shown in Table 3, it can be observed that the samples M4-M12 object of the present invention, have better oxygen induction times (OIT) with respect to those of the samples obtained using D-α-tocopherol, either alone (sample M1), or combined with α-lipoic acid (sample M2 and sample M3), also in the presence of a lower quantity of antioxidants (samples M4, M6 and M10).

TABLE 4

| DSC | OIT (190° C.) (minutes) | OIT (200° C.) (minutes) |
| --- | --- | --- |
| M13 | 4   | 1   |
| M14 | 1.5 | (a) |
| M15 | 1   | (a) |
| M16 | 45  | 23  |
| M17 | 29  | 15  |
| M18 | 24  | 13  |

(a): immediate oxidation

From the data shown in Table 4, it can be observed that the samples M16-M18 object of the present invention, have better oxygen induction times (OIT) with respect to those of the samples obtained using D-α-tocopherol, either alone (sample M14), or combined with α-lipoic acid (sample M15).

The invention claimed is:

1. A stabilized composition comprising:
   at least one homopolymer or copolymer of ethylene; and
   a mixture of tocotrienol isomers comprising:
   (a) from 30% by weight to 60% by weight of γ-tocotrienol having formula (Ic):

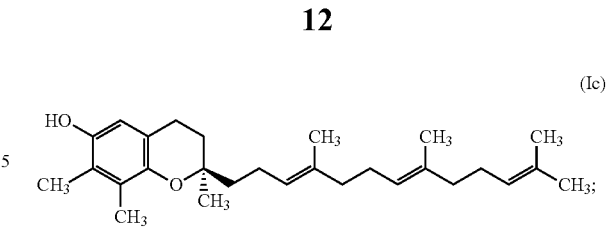

(b) from 20% by weight to 40% by weight of α-tocotrienol having formula (Ia):

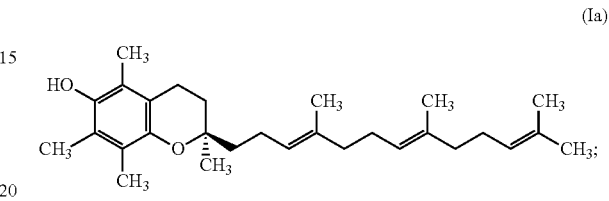

(c) from 10% by weight to 30% by weight of δ-tocotrienol having formula (Id):

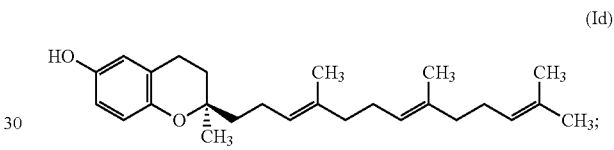

wherein the total of (a)+(b)+(c) is 100.

2. The stabilized composition according to claim 1, wherein said homopolymer or copolymer of ethylene is selected from the group consisting of:
   high-density polyethylene (HDPE);
   ultra-high-molecular-weight polyethylene (UHMWPE);
   medium-density polyethylene (MDPE);
   low-density polyethylene (LDPE);
   linear-low-density polyethylene (LLDEP), very-low-density polyethylene (VLDPE), ultra-low-density polyethylene (ULDPE), which are copolymers of ethylene with at least one aliphatic α-olefin having formula $CH_2=CH-R$ wherein R represents a linear or branched alkyl group, containing from 1 to 12 carbon atoms, selected from the group consisting of: propylene, 1-butene, 1-pentene, 1-hexene, 1-octene, and 1-decene;
   ethylene-vinyl acetate copolymers (EVA);
   elastomeric ethylene-propylene copolymers (EPR);
   elastomeric ethylene-propylene-diene copolymers (EPDM) wherein the diene generally contains from 3 to 12 carbon atoms and is selected from the group consisting of: 1,3-butadiene, isoprene, 1,4-hexadiene, 1,4-cyclohexadiene, 5-ethylidene-2-norbornene, 5-methylene-2-norbornene, or mixtures thereof; or mixtures thereof.

3. The stabilized composition according to claim 1, wherein said mixture of tocotrienol isomers is present in the stabilized composition in a quantity ranging from 0.01% by weight to 3% by weight with respect to the total weight of said stabilized composition.

4. The stabilized composition according to claim 1 comprising at least one compound containing sulfur selected from the group consisting of: α-lipoic acid, acetyl-cysteine, and glutathione.

5. The stabilized composition according to claim 4, wherein said compound containing sulfur is present in the stabilized composition in a quantity ranging from 0.05% by weight to 1.5% by weight with respect to the total weight of said stabilized composition.

6. The stabilized composition according to claim 1 comprising:
at least one stabilizing composition comprising:
($a_1$) from 50% by weight to 90% by weight of the mixture of tocotrienol isomers;
($b_1$) from 10% by weight to 50% by weight of tocopherol isomers;
the total of ($a_1$)+($b_1$) being 100.

7. The stabilized composition according to claim 6 comprising:
at least one compound containing sulfur selected from the group consisting of: α-lipoic acid, acetyl-cysteine, and glutathione.

8. The stabilized composition according to claim 6, wherein said homopolymer or copolymer of ethylene is selected from the group consisting of:
high-density polyethylene (HDPE);
ultra-high-molecular-weight polyethylene (UHMWPE);
medium-density polyethylene (MDPE);
low-density polyethylene (LDPE);
linear-low-density polyethylene (LLDEP), very-low-density polyethylene (VLDPE), ultra-low-density polyethylene (ULDPE), which are copolymers of ethylene with at least one aliphatic a-olefin having formula $CH_2=CH—R$ wherein R represents a linear or branched alkyl group, containing from 1 to 12 carbon atoms, selected from the group consisting of: propylene, 1-butene, 1-pentene, 1-hexene, 1-octene, 1-decene;
ethylene-vinyl acetate copolymers (EVA);
elastomeric ethylene-propylene copolymers (EPR);
elastomeric ethylene-propylene-diene copolymers (EPDM) wherein the diene generally contains from 3 to 12 carbon atoms and is selected from the group consisting of: 1,3-butadiene, isoprene, 1,4-hexadiene, 1,4-cyclohexadiene, 5-ethylidene-2-norbornene, 5-methylene-2-norbornene, or mixtures thereof; or mixtures thereof.

9. The stabilized composition according to claim 6, wherein said tocopherol isomers are selected from the group consisting of:
-D,L-α-tocopherol;
methyl derivatives of [2-methyl-2-(4',8'12'-trimethyltridecyl)-6-chromanol]tocol comprising D- α-tocopherol (5,7,8-trimethyltocol), D-βtocopherol (5,8-dimethyltocol), D-γ-tocopherol (7,8-dimethyltocol), D-δ-tocopherol (8-methyl-tocol), or mixtures thereof;
D-α-tocopherol acetate, D,L-α-tocopherol acetate, D-α-tocopherol succinate, acid polyethyleneglycol 1000 succinate of D-α-tocopherol, D,L-α-tocopherol quinone, or mixtures thereof; or mixtures thereof.

10. The stabilized composition according to claim 7, wherein said compound containing sulfur is present in the stabilized composition in a quantity ranging from 0.05% by weight to 1.5% by weight with respect to the total weight of said stabilized composition.

11. The stabilized composition according to claim 6, wherein said stabilizing composition is present in the stabilized composition in a quantity ranging from 0.1% by weight to 3% by weight with respect to the total weight of said stabilized composition.

12. A method of stabilizing homopolymers or copolymers of ethylene said method comprising:
providing a stabilizing composition comprising:
a mixture of tocotrienol isomers comprising:
(a) from 30% by weight to 60% by weight of γ-tocotrienol having formula (Ic):

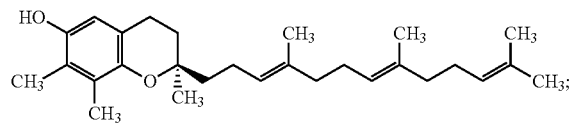

(b) from 20% by weight to 40% by weight of α-tocotrienol having formula (Ia):

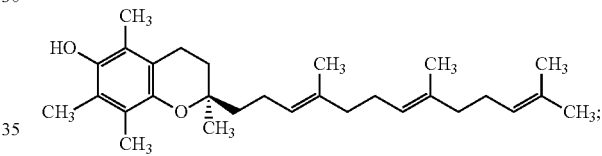

(c) from 10% by weight to 30% by weight of δ-tocotrienol having formula (Id):

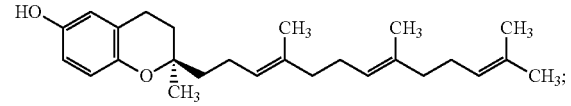

wherein the total of (a)+(b)+(c) is 100; and
combining the stabilizing composition with homopolymers or copolymers of ethylene.

13. The method of stabilizing homopolymers or copolymers of ethylene according to claim 12, said method comprising combining at least one compound containing sulfur selected from the group consisting of α-lipoic acid, acetyl-cysteine, and glutathione.

* * * * *